United States Patent [19]
Kanai et al.

[11] Patent Number: 5,790,338
[45] Date of Patent: Aug. 4, 1998

[54] LIBRARY APPARATUS THAT CORRECTS RELATIVE POSITION DISPLACEMENT BETWEEN A CARRY ROBOT AND A STORING RACK

[75] Inventors: Hirofumi Kanai, Hiratsuka; Kenji Toki, Odawara, both of Japan

[73] Assignee: Hitachi, Ltd., Tokyo, Japan

[21] Appl. No.: 711,187

[22] Filed: Aug. 29, 1996

Related U.S. Application Data

[63] Continuation of Ser. No. 318,309, Oct. 5, 1994, abandoned.

[30] Foreign Application Priority Data

Oct. 6, 1993 [JP] Japan ................ 5-250307

[51] Int. Cl.$^6$ ................ G11B 15/18; G11B 15/68
[52] U.S. Cl. ................ 360/71; 360/92
[58] Field of Search ................ 360/69, 71, 92; 414/273, 274, 276

[56] References Cited

U.S. PATENT DOCUMENTS

| | | | |
|---|---|---|---|
| 5,303,034 | 4/1994 | Carmichael et al. | 414/273 |
| 5,331,232 | 7/1994 | Moy et al. | 318/568.11 |
| 5,429,470 | 7/1995 | Nicol et al. | 360/92 X |

FOREIGN PATENT DOCUMENTS 2-94157  4/1990  Japan .

Primary Examiner—Andrew L. Sniezek
Assistant Examiner—Regina Y. Neal
Attorney, Agent, or Firm—Kenyon & Kenyon

[57] ABSTRACT

A library apparatus has a recording and reproducing unit and a storing rack having a number of shelves each adapted to store a recording medium and a carry robot is moved between shelves of the storing rack or between the recording and reproducing unit and a shelf of the storing rack to load/unload a target recording medium to/from a shelf or the recording and reproducing unit. A photosensor is mounted to the tip of a hand of the carry robot. The carry robot is moved to the target shelf in two-step control. Namely, a robot controller calculates the position of the target shelf and moves the robot to the calculated position in a coarse control. Then, a position of a framework relating to the target shelf of the storing rack is detected accurately based on the signal from the photosensor and a position recognition controller determines a displacement of an actual position of the target shelf from the calculated position to apply positional correction to the target position and causes the robot controller to position the robot hand to the actual position in a fine control. Resulting position correction information is stored in a storing rack position information memory to decrease the operation time in the second and ensuing positioning operations.

14 Claims, 7 Drawing Sheets

LIBRARY APPARATUS THAT CORRECTS RELATIVE POSITION DISPLACEMENT BETWEEN A CARRY ROBOT AND A STORING RACK

This application is a continuation of application Ser. No. 08/318,309 filed Oct. 5, 1994, now abandoned.

BACKGROUND OF THE INVENTION

The present invention relates to a library apparatus for storing a large amount of information and more particularly to positioning control for correcting relative position displacement between a carry robot and a storing rack or a recording and reproducing unit in the library apparatus.

Accuracy of positioning in the library apparatus is defined by a positional error occurring between the tip of a hand of the carry robot and the storing rack after the carry robot has been positioned to a given position.

As disclosed in JP-A-2-94157, positioning control of the carry robot in the prior art is not effected on the basis of information about a positional error between the hand tip and the storing rack but is carried out on the basis of positional information of a sensor attached to a portion other than the hand tip.

Consequently, the positional accuracy is confirmed at the sensor mount portion of the robot but the positional relation between the hand tip and the storing rack cannot be guaranteed.

To better guarantee this positional relation, the positional relation between (1) the sensor mount portion and the hand tip; and (2) the sensor mount portion and the storing rack must be managed strictly by controlling accuracy of mechanical elements constituting the library apparatus.

Accordingly, it is necessary to increase the stiffness of a robot mechanism and a storing rack mount cabinet and practice positional adjustment of the sensor and the like, causing a bottleneck in promoting reduction of size and weight of the apparatus and reduction of costs.

Incidentally, when magnetic tapes each having a roll of about 250 grams are respectively stored in all shelves of storing rack in a storing rack mount cabinet to which a storing rack for 9000 rolls of cartridge type magnetic tape attached, a total load of about 2,000 Kg is applied to the storing rack mount cabinet. It will easily be understood that the storing rack mount cabinet is required to have high stiffness to support the load without causing deformation of the storing rack.

SUMMARY OF THE INVENTION

The aforementioned prior art takes care of guaranteeing of positional accuracy between the hand tip and the storing rack by promoting accuracy of mechanical elements and therefore fails to take size reduction, weight reduction and cost reduction into consideration.

The present invention is to provides an apparatus construction which can promote positional accuracy between the hand tip of a carry robot and a storing rack inside a library apparatus without resort to accuracy of mechanical elements.

According to the present invention, to accomplish the above object, means for detecting the position of the storing rack is provided at the tip of a hand of a carry robot, and the carry robot is positioned to a target position on the basis of positional information detected by the means.

Further, means is provided for storing information about positions of individual shelves of the storing rack, and positional control is practiced on the basis of that information.

In the storing rack position detecting means packaged near the hand tip of the carry robot, a reflection type photosensor emits light and detects reflection light from the storing rack to detect a position of the storing rack, thereby providing positional information on the basis of which control is performed. Through this, the hand tip can be positioned accurately to the storing rack. The positional information is stored in memory means.

The positional information for individual shelves of storing rack stored in the memory means is used as correction position information when the carry robot practices position control. Typically, by practicing the position control on the basis of the correction position information, the hand tip of the carry robot can be positioned accurately to the storing rack.

DETAILED DESCRIPTION

Referring now to FIGS. 1, 2, 3 and 4, an embodiment of the present invention will be described.

Figure 1:
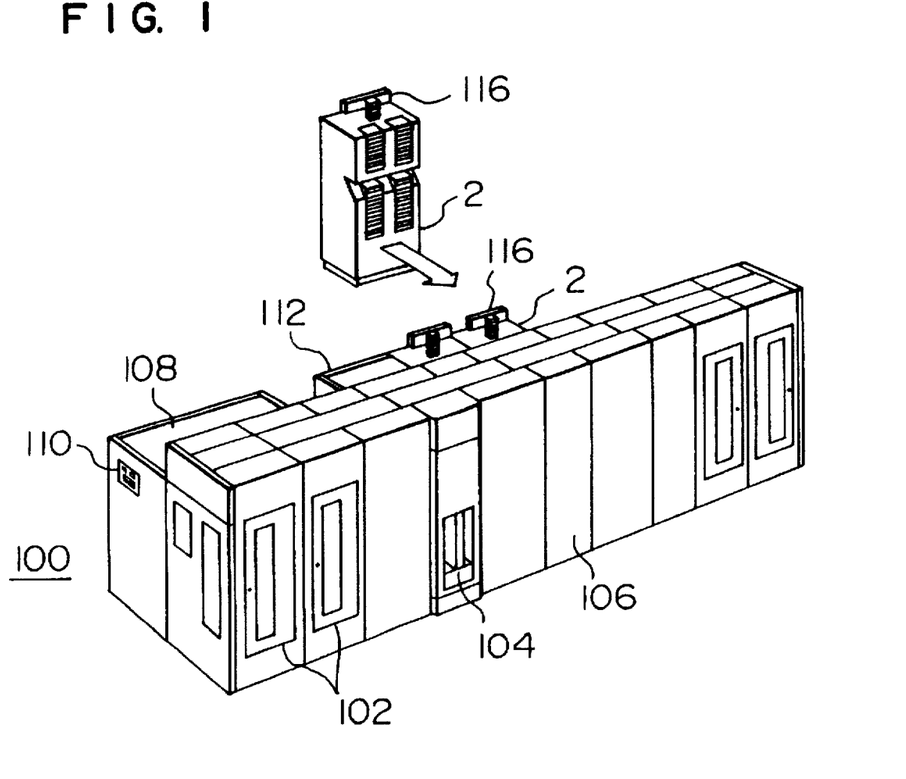
FIG. 1 is a perspective view showing the external appearance of a library apparatus according to an embodiment of the present invention.
Figure 2:
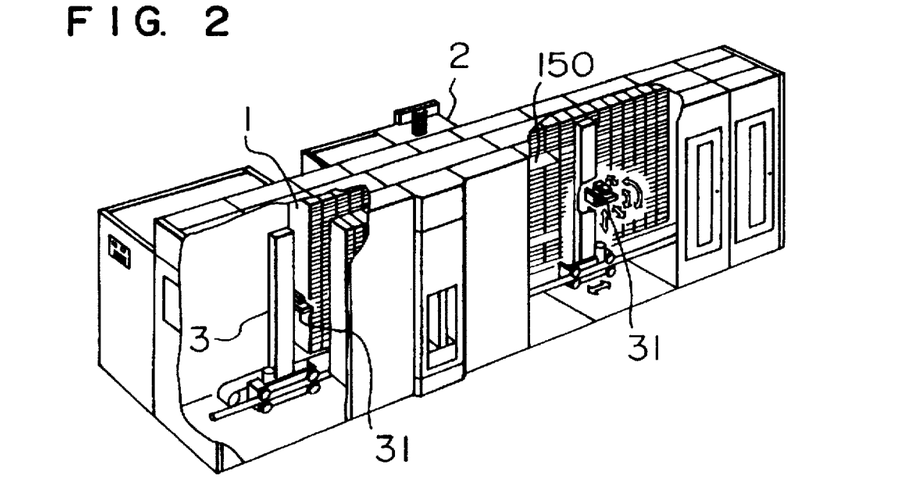
FIG. 2 is a partly exploded view of the FIG. 1 library apparatus.
Figure 3A:
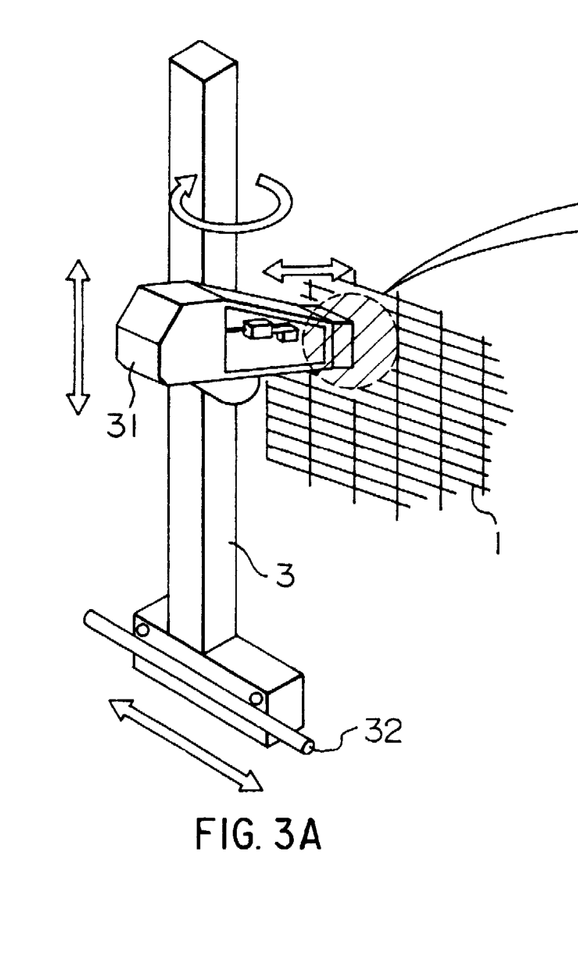
FIG. 3 is a partial perspective view showing a carry robot, depicting a hand portion of the carry robot in partial enlarged view form.
Figure 3B:
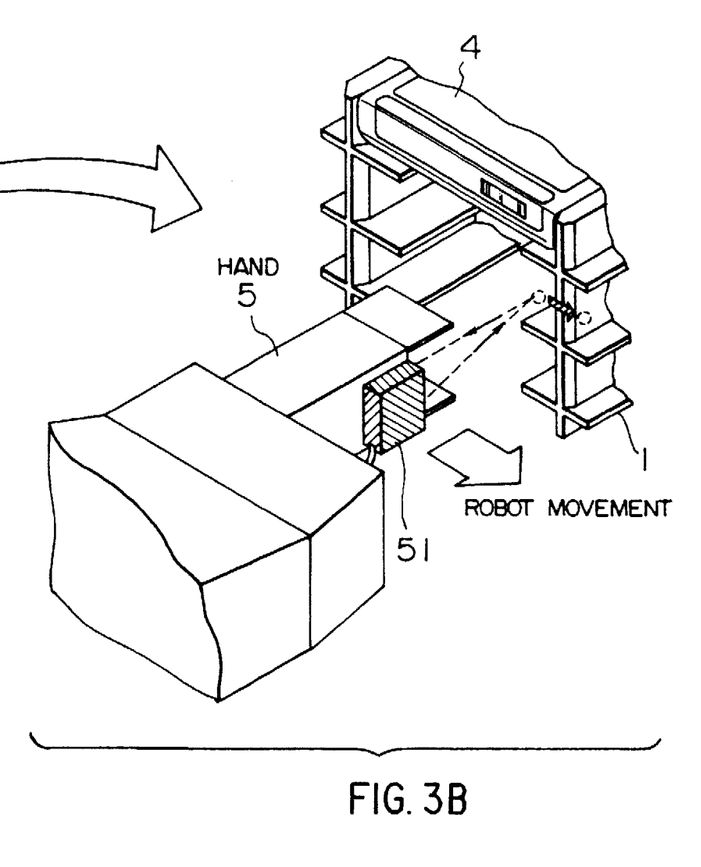
Figure 4:
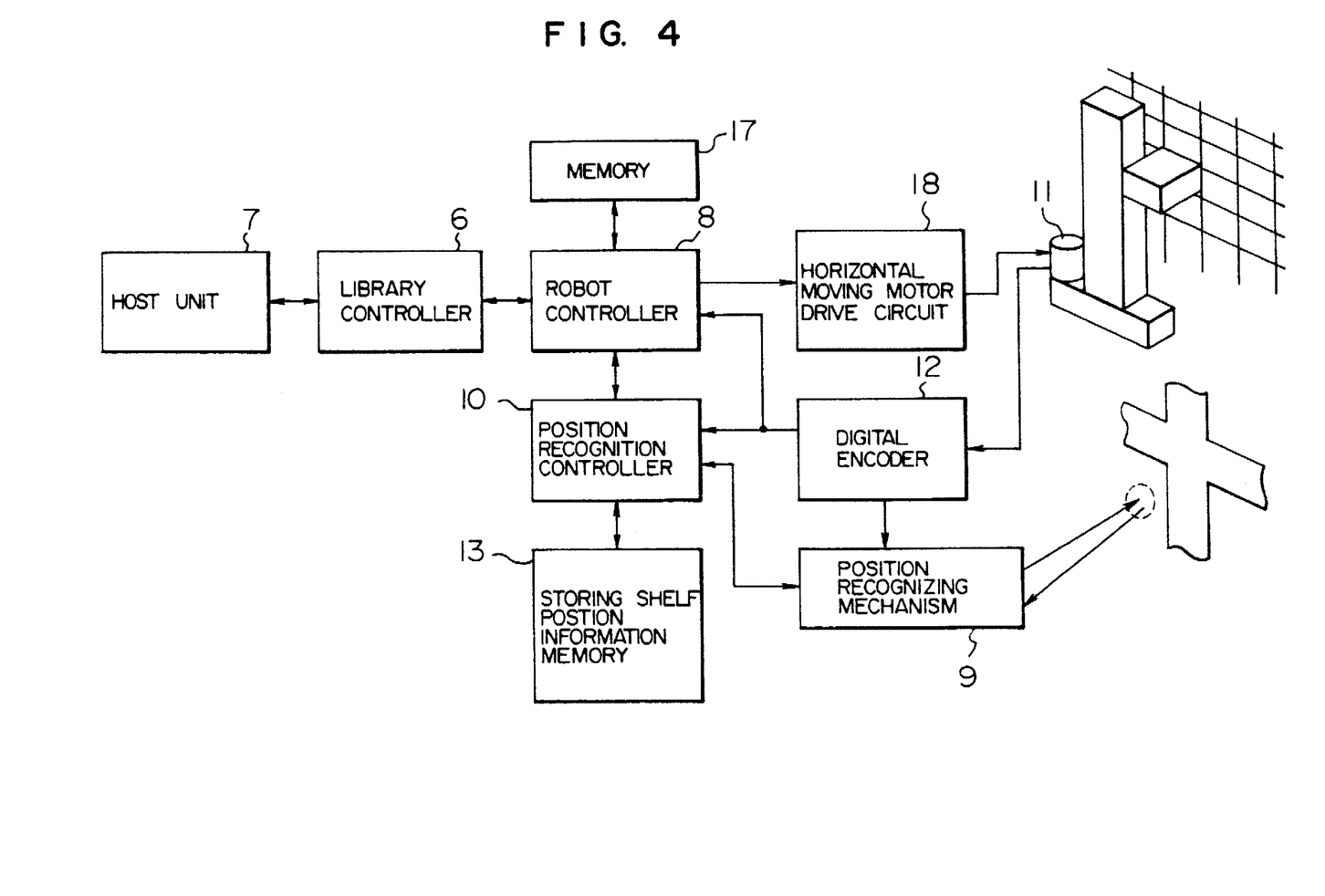
FIG. 4 is a block diagram showing the construction of the library apparatus.

FIG. 1 is a perspective view showing the external appearance of a library apparatus 100, FIG. 2 is a partly exploded view of the library apparatus, FIG. 3 is an enlarged view showing a storing rack and a hand portion of a carry robot, and FIG. 4 is a block diagram showing the function of the library apparatus.

In FIG. 1, reference numeral 102 designates doors, 104 a magnetic tape charge/discharge port, and 106 a magnetic tape storage chamber. Accommodated in the magnetic tape storage chamber are storing racks each having a great number of shelves each storing a magnetic tape 4 (FIG. 3). Denoted by 108 is a library controller, by 110 a message panel of the library apparatus 100, by 112 a magnetic tape controller, by 2 a magnetic recording and reproducing unit (magnetic tape drive) and by 116 a message panel of the magnetic recording and reproducing unit 2.

In FIG. 2, a carry robot 3 is arranged in the library apparatus most frontally thereof, sequentially followed by a recording medium storing rack 1 and a recording and reproducing unit 2.

The robot has a manipulator 31 which is movable in vertical and horizontal directions and rotatable about the vertical axis.

When a hand 5 (shown in FIG. 3) mounted to the tip of the manipulator 31 takes out a desired magnetic tape from a shelf, the robot 3 moves the taken-out magnetic tape to the position of an opening 150 and loads it on the recording and reproducing unit 2 through the opening 150.

The robot hand 5 acts to take out a cartridge type magnetic tape (recording medium) 4 received in the storing rack 1 (or load it on the storing rack 1) as shown in FIG. 3.

Firstly, the overall operation of the library apparatus will be described by referring to the case where a recording medium is taken out.

Referring to FIG. 4, a library controller 6 responds to a command from a host unit 7 to designate to a robot controller 8 a physical position of a shelf of storing rack 1 in which a given recording medium 4 designated by the host unit 7 is stored.

In response to this command, the robot controller 8 controls a horizontal moving motor drive circuit 18 and a vertical moving motor drive circuit (not shown) such that the carry robot 3 is moved along a running rail 32 in the horizontal direction and along a vertical rail (not shown) inside robot 3 in the vertical direction, thereby positioning the manipulator 31 to a given site, and thereafter drives the hand 5 to take out the recording medium 4. A memory 17 is adapted to store the physical position of a recording medium load/unload port of the recording and reproducing unit 2.

Reverting to the conventional carry robot 3, its position is not controlled by directly detecting a position of the storing rack 1 but is controlled by indirectly recognizing a position of the storing rack on condition that the positional relation between the hand tip and the storing rack is warranted by mechanical stiffness of the cabinet and structure. As a result, the weight of the whole apparatus cannot be reduced. In addition, the accuracy of positioning is limited and the efficiency of storage of recording medium cannot be increased.

The present invention intends to provide a storing rack position recognizing mechanism 9 ( FIG. 4) for directly recognizing the position of the storing rack 1 and a position recognition controller 10 and ensure working of a system which is effective to utilize the recognized positional information.

In the present invention, the position recognizing mechanism 9 includes a reflection type photosensor 51, an amplifier circuit (not shown) and a storing rack detection circuit (not shown). As shown in FIG. 3, the reflection type photosensor 51 is packaged on the carry robot 3 near the tip of the hand 5. The amplifier circuit amplifies an output signal of the reflection type photosensor 51 and supplies it to the storing rack detection circuit.

The position recognition controller 10 responds to a command from the robot controller 8 to operate the position recognizing mechanism 9, and on the basis of information from the storing rack detection circuit and a digital encoder 12, it recognizes the storing rack position.

More specifically, by irradiating light on a framework of the storing rack 1 and detecting reflected light, the center position of the framework is detected.

The operation of the present invention will be described by limiting it to a specified operation of position control in the horizontal direction. Essentially, position control in the vertical direction resembles the position control in the horizontal direction.

In the present embodiment, "coarse control" is first practiced wherein the distance from a reference position is controlled by a motor encoder and after completion of the "coarse control", "fine adjustment control" is practiced wherein the position of the hand tip relative to the storing rack is recognized by the reflection type photosensor and controlled.

The "coarse control" will first be described.

The robot controller 8 recognizes that a given recording medium storing position designated by the library controller 6 equals a position of a shelf which is n-th when counted from an arbitrary reference position Xo (not shown) and then calculates distance Xn=n*Xs from the reference position Xo on the assumption that the interval between adjacent shelves has a known constant value of Xs. The position of the carry robot 3 is recognized as the number of pulses counted from the reference position Xo by means of the digital encoder 12 packaged concentrically with the shaft of a horizontal drive motor 11 for driving the carry robot 3 in the horizontal direction and on the basis of this pulse number, the carry robot is positioned to the position of a given shelf, that is, Xn.

With "coarse control" only the influence of irregularity in accuracy of the size and assembly of the cabinet and mechanism parts takes place in effect, causing an error in the relative positional relation between the tip of the carry robot hand 5 and a shelf of storing rack 1. Accordingly, use of only the indirect positional control ("coarse control") fails to ensure smooth load/unload of a recording medium 4 to/from the shelf of storing rack 1.

Figure 5:
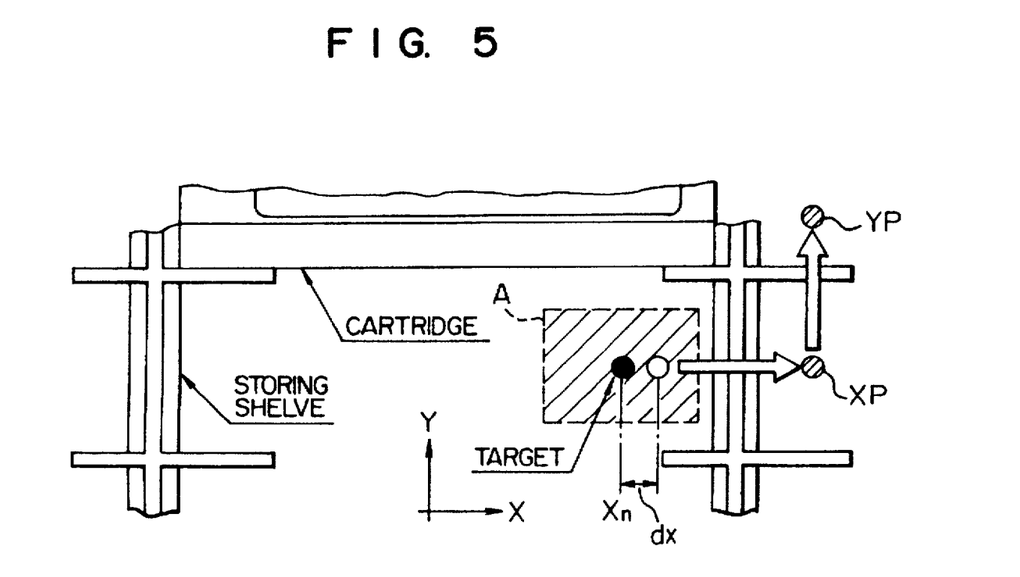
FIG. 5 is a diagram useful to explain fine adjustment control operation.
Figure 6:
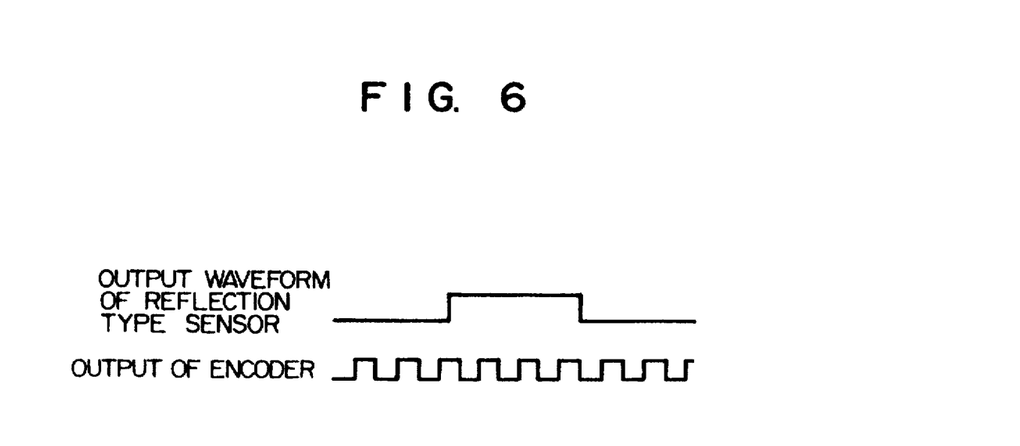
FIG. 6 is a signal waveform diagram useful to explain the operation of a storing rack detection circuit in a position recognition mechanism.

Next, "fine adjustment control" will be described. FIG. 5 is a diagram for explaining the operation of the "fine adjustment control" and FIG. 6 is a waveform diagram useful to explain the operation of the storing rack detection circuit. In FIG. 5, a filled circle represents a spot of the reflection type photosensor under the condition that the positional relation between the hand tip and the storing rack is ideal. In other words, the positional control of the present invention aims at such control that the spot of the reflection type photosensor is brought to the position of filled circle.

In FIG. 5, a hatched area A shows a permissible range of the spot of the reflection type photosensor when the "coarse control" ends, indicating that irregularity in accuracy of parts and assembly will cause such an error as above relative to the target position. When the "coarse control" ends, the spot of the photosensor is positioned within the hatched area A.

The following description will be given on the assumption that the spot of the reflection type photosensor has been brought to a position of empty circle when the "coarse control" ends.

As shown at arrow in FIG. 5, the robot controller 8 causes the robot to move across a given vertical framework (vertical rib) of the storing rack in the horizontal direction and concurrently with this movement of the robot, issues to the position recognition controller 10 a request for recognizing a position of the storing rack. The position recognition controller 10 operates the position recognizing mechanism 9, so that the storing rack detection circuit in the position recognizing mechanism 9 detects the center position of the vertical framework (vertical rib) of the storing rack from an output of reflection type photosensor which changes with the horizontal movement of the robot. Namely, the reflection type photosensor has a light emitting unit and a light receiving sensor and detects the presence or absence of an object by receiving reflection light as a result of reflection of light which is emitted from the light emitting unit to irradiate the object.

The output signal of the reflection type photosensor having a waveform as shown in FIG. 6 is inputted to the storing rack detection circuit inside the position recognizing mechanism 9, and the digital encoder 12 for the horizontal drive motor 11 produces an output signal of a waveform also shown in FIG. 6. By counting the number of pulses of the digital encoder 12 to determine the duration in which the output signal of the reflection type photosensor is "high", it can be decided as to whether or not the object crossed by the reflection type photosensor is a vertical framework of the storing rack. The storing rack detection circuit is also used for detecting the position of a recording medium load/unload port of the recording and reproducing unit 2.

The position of a vertical rib of the storing rack 1 is determined by counting a distance from the position Xn settled at the end of the coarse control and now used as a reference, by means of the digital encoder 12 for the horizontal drive motor 11. The target position (filled circle) corresponding to the center position of a shelf of storing rack 1 is then calculated from the vertical rib position, and a difference distance dX between the target position and the position Xn settled at the end of the coarse control is determined. The difference distance dX is a distance by which a relative positional error between the tip of the robot hand 5 and the storing rack 1 at the end of the "coarse control" is corrected. Eventually, by causing the robot controller 8 to position the carry robot 3 to a position which is Xn+dX distant from the reference position Xo, the tip of the hand 5 can be positioned accurately to the shelf of storing rack 1.

This correction distance dX is stored, as correction position information of individual shelves of the storing rack 1, in a storing rack position information memory 13. When positioning to the same shelf is carried out upon the second and ensuing positioning operations, the correction position information is read in advance and correction distance dX is used to provide a corrected position used as a target for which the same operation as the aforementioned "coarse control" is practiced.

Through this, if "fine adjustment control" is effected once to determine correction distance dX and the correction distance is precedently stored in the storing rack position information memory 13, accurate positioning can be practiced within a short period of time in the second and ensuing positioning operations and the operation time can be reduced considerably. Namely, by performing "fine adjustment control" after the library apparatus is installed, the positioning time upon utilization by the user can advantageously be reduced.

Figure 7:
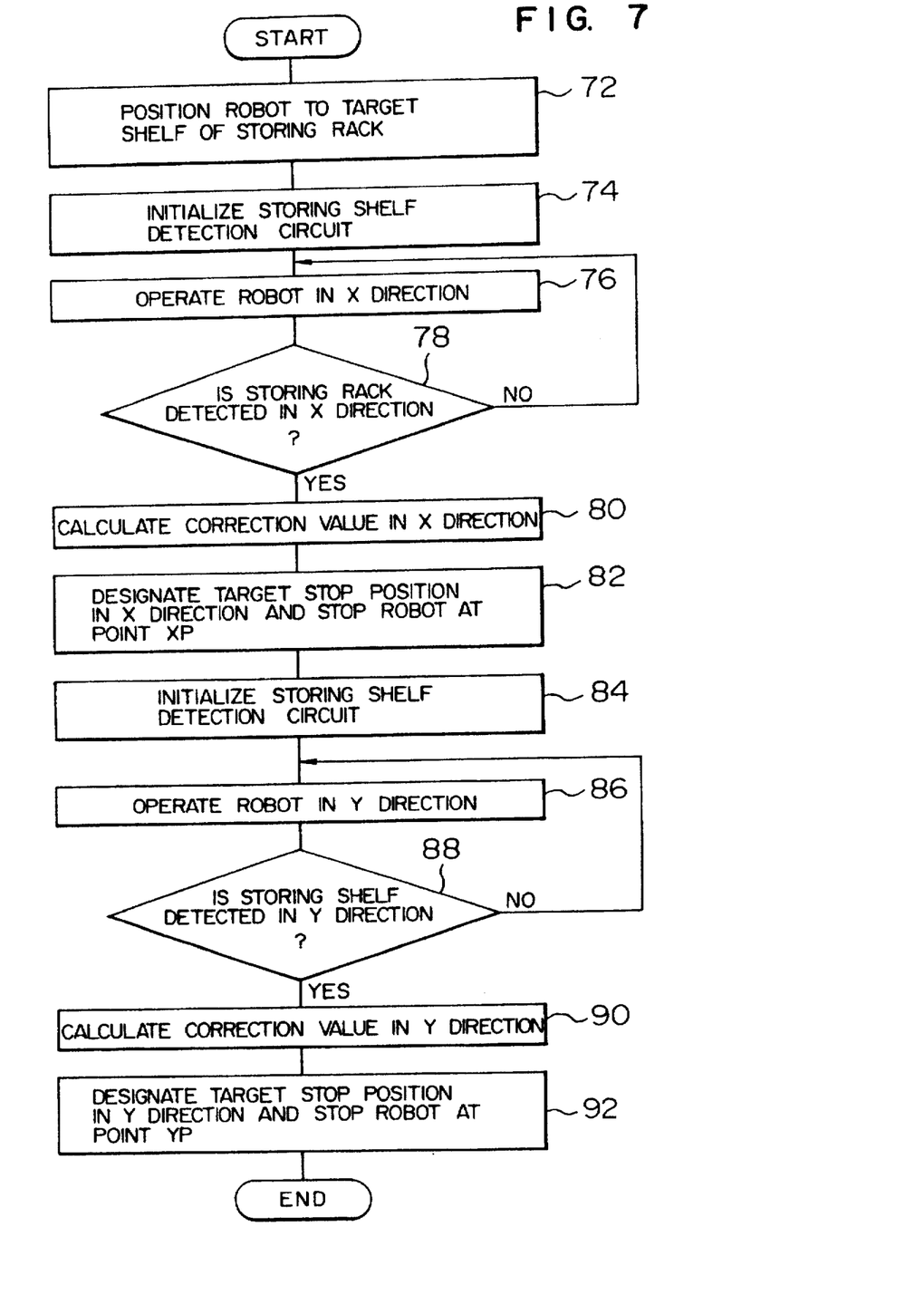
FIG. 7 is a flow chart of the operation of a position recognition controller 10.

FIG. 7 is a flow chart showing the operation of the position recognition controller 10 when the previously-described fine adjustment control is executed.

According to FIG. 7, the position recognition controller 10 controls the robot controller to position a robot to a target shelf of the storing rack (step 72) and then initializes the storing rack detection circuit (step 74). Subsequently, the position recognition controller 10 moves the robot in the X direction (step 76) and it responds to an output from the storing rack detection circuit to decide whether a vertical framework of a shelf is detected in the X direction or not (step 78). If undetected, the program returns to the step 76.

If detected, a correction value in the X direction is calculated from a position in the X direction set in the step 72 and a storing rack vertical framework position now detected (step 80). Subsequently, the position recognition controller 10 designates a target stop position in the X direction to the robot controller 8, causing the robot to stop at point XP shown in FIG. 5 (step 82). Thereafter, the controller 10 initializes the storing rack detection circuit (step 84) and operates the robot in the Y direction (step 86). Then, the controller 10 responds to an output of the storing rack detection circuit to decide whether a horizontal framework of the shelf is detected in the Y direction (step 88). If undetected, the program returns to the step 86. If detected, a correction value in the Y direction is calculated from a position in the Y direction set in the step 72 and a storing rack horizontal framework position now detected (step 90). Subsequently, the position recognition controller 10 commands a target stop position in the Y direction to the robot controller 8, causing the robot to stop at point YP (FIG. 5) (step 92). Through the above operation, the fine adjustment control is completed.

Next, the function to presume positions of all shelves of the storing rack 1 from positions of a few shelves will be described.

Figure 8:
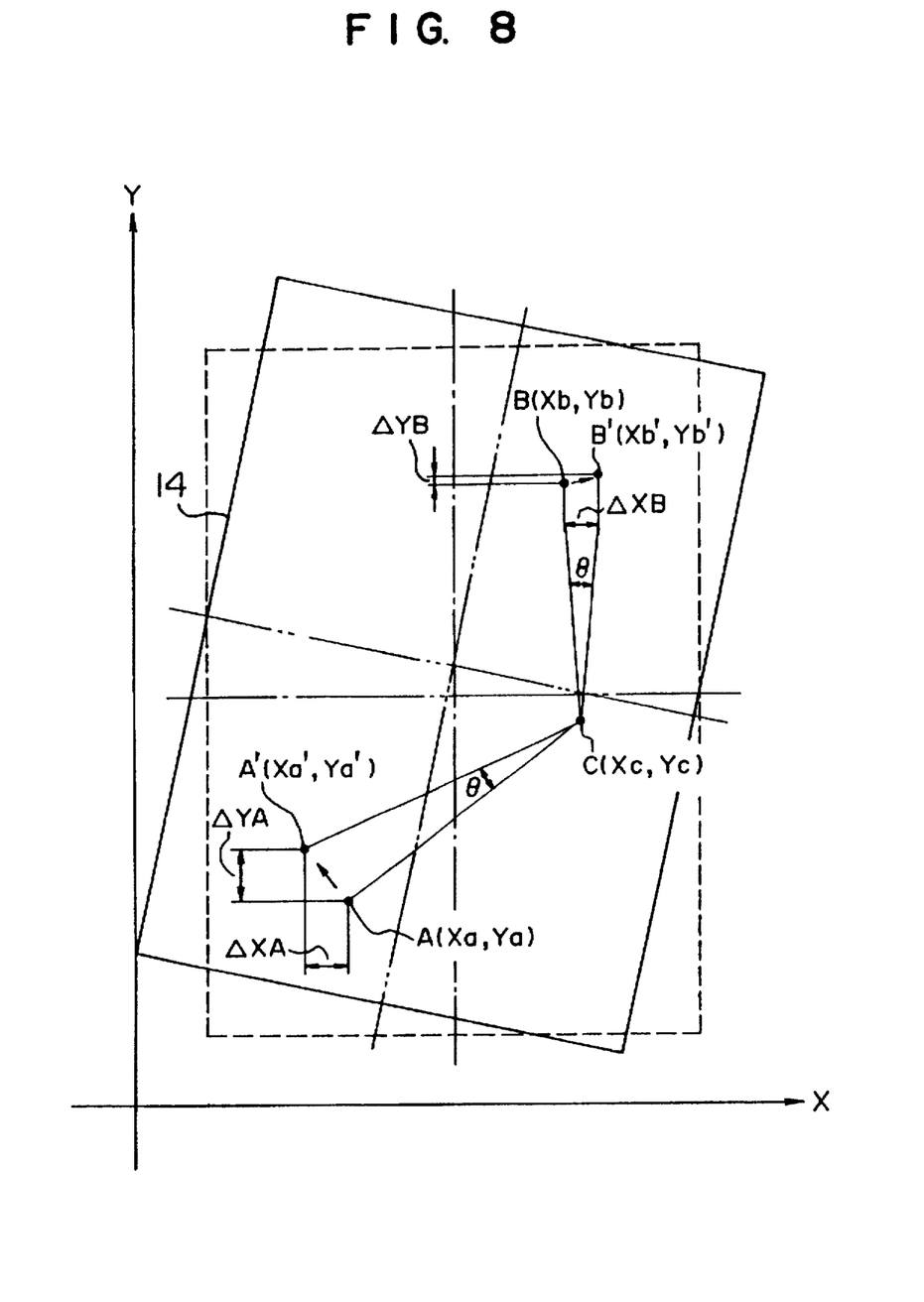
FIG. 8 is a diagram useful to explain correction of inclined position of the storing rack.

FIG. 8 is a diagram for explaining correction of inclined positions on a vertical plane of the storing rack 1, showing the positional relation between the tip of the hand 5 of robot 3 and the whole of the storing rack 1. Structurally, individual shelves of the storing rack 1 are fixed on a single pallet 14 and accuracy of mounting of the shelves within the pallet 14 is mechanically ensured.

As shown in FIG. 8, the pallet 14 is rotated by θ about center C to undergo positional displacement from the tip of the hand 5 of robot 3. In order to determine correction distances dX for all of the shelves of storing rack 1 within the pallet 14 through calculation, the position of the center C and rotation angle θ must be determined indirectly.

Position (Xc, Yc) of the center C will be determined.

Firstly, "fine adjustment control" is practiced for positions of two shelves of storing rack 1 generally on a diagonal of the pallet 14. More specifically, for positions A(Xa, Ya) and B(Xb, Yb), actual positions A'(Xa', Ya') and B'(Xb', Yb') and correction distances (dXa, dYa) and (dXb, dYb) associated therewith are determined. Then, by utilizing the fact that positions of C, A, A', B and B' are related to each other by distance between C and A=distance between C and A' distance between C and B=distance between C and B', there result $$(Xa-Xc)+(Ya-Yc)=(Xa'-Xc)+(Ya'-Yc) \quad (a)$$

$$(Xb-Xc)+(Yb-Yc)=(Xb'-Xc)+(Yb'-Yc) \quad (b)$$

and therefore, from equations (a) and (b), C representative of pallet rotation center position (Xc, Yc) is determined.

Next, by applying the theorem of cosines to the positional relation among C, A, A', B and B', the rotation angle θ is determined from the following equation:

$$\theta = \cos^{-1}(\alpha/\beta)$$

where $$\alpha = \{(Xa - Xc)^2 + (Ya - Yc)^2\} + \{(Xa' - Xc)^2 + (Ya' - Yc)^2\} +$$

-continued $$\beta = 2 \times \sqrt{(Xa - Xc)^2 + (Ya - Yc)^2} \times \sqrt{(Xa' - Xc)^2 + (Ya' - Yc)^2} \qquad \frac{\{(Xa' - Xa)^2 + (Ya' - Ya)^2\}}{}$$

Thus, by carrying out "fine adjustment control" for only two shelves of storing rack 1 on a diagonal of the pallet 14, the position of C and the rotation angle θ can be determined and correction positions for all shelves of storing rack within the pallet can be determined through calculation. Accordingly, there is no need of practicing the "fine adjustment control" for all shelves of storing rack 1 and hence the time for recognition and calculation of correction position dX can be reduced considerably.

While in the foregoing the case where a recording medium is taken out of the storing rack 1 has been described, an instance where a recording medium is loaded on or taken out of the recording and reproducing unit 2 will now be described with reference to FIG. 9.

Figure 9:
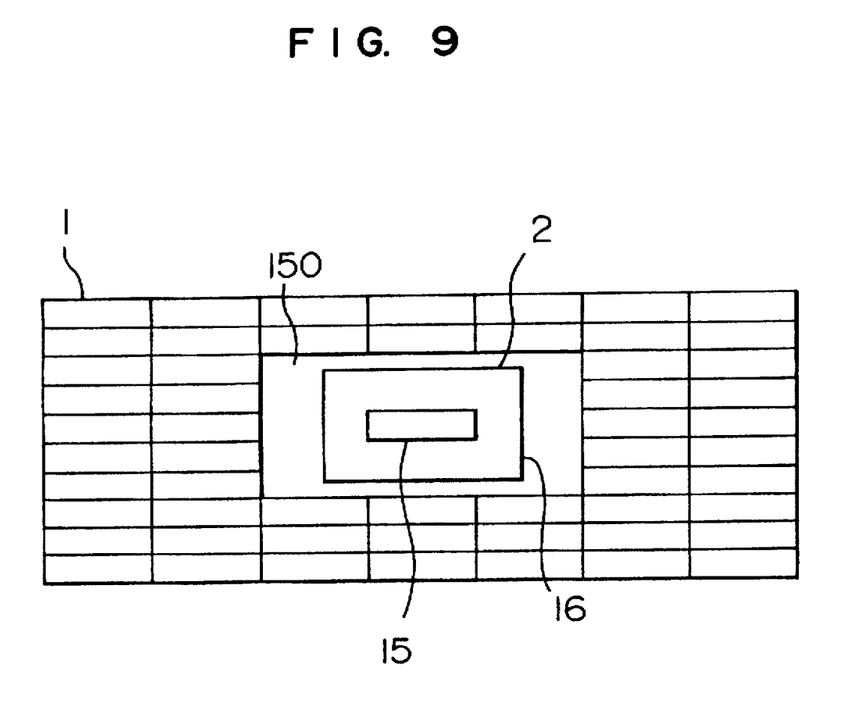
FIG. 9 is a diagram showing a recording medium load/unload port of a recording and reproducing unit.

FIG. 9 depicts the opening 150 in FIG. 2 in greater detail. Load/unload of a recording medium on/from the recording and reproducing unit 2 is effected similarly to load/unload of a recording medium on/from the storing rack 1. More particularly, the library controller 6 reads a physical position Xn, designated by the host unit 7, of the medium load/unload port 15 of recording and reproducing unit 2 to perform "coarse control", so that "fine adjustment control" for a marker 16 attached near the medium load/unload port 15 can subsequently be practiced to determine a correction distance dX. Correction position information of individual recording and reproducing units 2 is stored in the storing rack position information memory 13.

According to the present invention, there is no need of warranting accuracy by the stiffness of mechanical parts such as the carry robot mechanism and storing rack mounting cabinet and therefore performance of the carry robot can be improved and production costs can be reduced by virtue of considerable reduction in weight. In addition, the position of the storing rack 1 can be recognized directly, thereby improving positional accuracy. Through this, the interval between adjacent shelves of storing rack 1 can be narrowed and storage efficiency can be improved considerably.

What is claimed is:

1. A library apparatus comprising: storing rack having a number of shelves each adapted to store a recording medium;

at least one recording and reproducing unit compatible with a recording medium stored on said storing rack;

a carry robot having a hand operative to hold or release a recording medium, said carry robot being movable between shelves of said storing rack or between a shelf of said storing rack and a recording and reproducing unit, said hand having a position detection element, said position detection element including a reflection type photosensor having a light emitting unit and a light receiving sensor to detect a light emitted from said light emitting unit and reflected from a framework of said shelves; a library controller having information identifying a physical storing position of a recording medium designated by a host unit; a robot controller for responding to an output of said library controller to calculate a position of a target shelf or a position of a recording medium of said recording and reproducing unit, moving said carry robot to the calculated position in a coarse control, and after the movement, issuing a request for fine recognition of the position of said target shelf or the position of said recording and reproducing unit and again moving said carry robot from the calculated position so as to cross a framework of the target shelf; and a position recognition controller responsive to the fine recognition request and (1) determining a position of said framework of the target shelf relative to the calculated position on the basis of a signal from said position detection element, (2) calculating an actual position within said target shelf relative to the framework position, (3) calculating a displacement of the actual position within the target shelf from the calculated position and (4) causing said robot controller to position said hand of said robot to said actual position in a fine control.

2. A library apparatus according to claim 1 wherein said detection element detects a position of a marker disposed near a load/unload port of said recording and reproducing unit.

3. A library apparatus according to claim 1 further comprising a memory that stores information about the position of said target shelf or said recording and reproducing unit calculated by said position recognition controller.

4. A library apparatus according to claim 1 wherein displacement of actual positions of a subset of said shelves or said recording and reproducing unit calculated by said position recognition controller are used to calculate actual positions of the remaining shelves or recording and reproducing units.

5. A library apparatus according to claim 1 wherein displacements of two actual positions of said shelves and said recording and reproducing unit from corresponding two calculated positions substantially along a diagonal of said rack are calculated by said position recognition controller and are used to calculate a displacement of an actual position of a desired target shelf or recording and reproducing unit among the remaining shelves or recording and reproducing units caused by an inclination or rotation of said rack and causing said robot controller to position said hand of said robot to said actual position.

6. A library apparatus comprising:

a storing rack having a number of shelves each adapted to store a recording medium;

at least one recording and reproducing unit compatible with a recording medium stored on the storing rack;

a carry robot having a hand operative to hold or release a recording medium and movable between shelves of said storing rack or between a shelf of said storing rack and a recording and reproducing unit, said hand having a position detection element, said position detection element including a reflection type photosensor having a light emitting unit and a light receiving sensor to detect a light emitted from said light emitting unit and reflected from a framework of said shelves;

a robot controller calculating a position of a target shelf or a position of a recording medium of said recording and reproducing unit and moving said carry robot to the calculated position in a coarse control;

a position recognition controller, responsive to a signal from said robot controller, performing the steps of: (1) determining a position of a framework of the target shelf relative to the calculated position on the basis of a signal from said position detection element, (2) calculating an actual position within said target shelf relative to the framework position, (3) calculating a displacement of the actual position within the target shelf from the calculated position and (4) causing said robot controller to position said hand of said robot to said actual position in a fine control.

7. A library apparatus according to claim 6, wherein said detection element detects a position of a marker disposed near a load/unload port of said recording and reproducing unit.

8. A library apparatus according to claim 6, further comprising a storing rack position information memory for storing the position of said target shelf or said recording and reproducing unit calculated by said position recognition controller.

9. A library apparatus according to claim 6, wherein position of certain of target shelves calculated by said position recognition controller are used to calculate positions of the remaining shelves.

10. A library apparatus according to claim 6, wherein displacements of two actual positions of said shelves and said recording and reproducing unit from corresponding two calculated positions substantially along a diagonal of said rack are calculated by said position recognition controller and are used to calculate a displacement of an actual position of a desired target shelf or recording and reproducing unit among the remaining shelves or recording and reproducing units caused by an inclination or rotation of said rack and causing said robot controller to position said hand of said robot to said actual position.

11. A library apparatus comprising:

a storing rack having a number of shelves each adapted to store a recording medium;

a carry robot having a hand operative to hold or release a recording medium, said robot being movable between shelves of said storing rack, said hand having a position detection element, said position detection element including a reflection type photosensor having a light emitting unit and a light receiving sensor to detect a light emitted from said light emitting unit and reflected from a framework of said shelves;

a library controller having information identifying a physical storing position of a given recording medium;

a robot controller, using said information from said library controller to calculate a position of a target shelf, directing said robot to the calculated position in a coarse control, and after the movement issuing a request for fine recognition of the position of said target shelf; and a position recognition controller responsive to the fine recognition request (1) determining a position of a framework of the target shelf relative to the calculated position on the basis of a signal from said position detection element, (2) calculating an actual position within said target shelf relative to the framework position, (3) calculating a displacement of the actual position within the target shelf from the calculated position and (4) and directing said robot controller to position said hand of said robot to said actual position in a fine control on the basis of said calculated displacement.

12. A library apparatus according to claim 11, further comprising a storing rack position information memory for storing information about the position of said target shelf calculated by said position recognition controller.

13. A library apparatus according to claim 11, wherein information about the displacement of actual positions of a subset of said shelves, calculated by said position recognition controller, is used to calculate actual positions of the remaining shelves.

14. A library apparatus according to claim 1 wherein displacements of two actual positions of said shelves from corresponding two calculated positions substantially along a diagonal of said rack are calculated by said position recognition controller and are used to calculate a displacement of an actual position of a desired target shelf among the remaining shelves caused by an inclination or rotation of said rack and causing said robot controller to position said hand of said robot to said actual position.

* * * * *